May 30, 1967  D. E. JOSEPH  3,323,029
PORTABLE CONTROL FOR A MACHINE TOOL MOTOR SYSTEM
Filed June 26, 1963

INVENTOR.
DANIEL E. JOSEPH
BY
Laurence M. Goodridge
ATTORNEY

United States Patent Office 3,323,029
Patented May 30, 1967

3,323,029
PORTABLE CONTROL FOR A MACHINE TOOL
MOTOR SYSTEM
Daniel E. Joseph, 10306 Viscount,
St. Louis, Mo. 63136
Filed June 26, 1963, Ser. No. 290,845
4 Claims. (Cl. 318—17)

This invention relates to a manually operated portable circuit controlling electric unit including a switch which can be carried in the operator's hand, or attached securely by means of a permanent magnet to a machine tool in any convenient location, and the method of using the same with machine tools, and, especially, the kind which, when once set up, will follow a sequence of operations automatically.

Some machine tools are provided with a number of adjustments to permit machine set up operations, and these operations are performed only by highly skilled machinists. When the set up adjustments are completed, the adjusting devices are locked in place often by a key so that production machine operators cannot tamper with the set up adjustments. When such machines are of large size, weight of the movable parts and tools makes manual adjustments impractical and electric, or electric controlled, hydraulic power operation is necessary. Thus, in large machine, the set up is controlled by numerous push button switches usually grouped on a control panel of the machine in a position which is intended to be accessible for the set up machinist, but this is not always the case because of the fact that both tool holders and control panel cannot be in the same place, and the fact that adjustments are sometimes necessary at the end of the machine farthest from the panel. After the set up is complete, the control panel may be required to be locked up to prevent tampering.

Other machine tools are not automatic and require operation of various kinds of controls during operation. These controls may be manually operated, or power operated, depending wholly on the machine, or the manner it is set up. In either case, operation of the power driven parts normally require close control and one more convenient to the work piece than often provided. The control usually provided are of the push button electric switch kind in a machine control panel. The instant invention provides both a novel form and method as applied to a control for a machine tool.

It is an object of this invention to provide a novel method and means for operating any one of a plurality of electric controls on a machine tool.

It is another object of this invention to provide novel switch means for the above purpose which is portable and may be carried in the operator's hand, or secured in any convenient location for either manual operation, or storage purposes.

It is still another object of this invention to provide a novel method and means for operating a plurality of set up adjustments, or the like, on a machine tool which acts as a control and a key to selectively unlock and operate, and, subsequently, lock up the adjustments.

The invention includes a manually operated portable circuit control switch unit provided with means to removably secure the switch to, and remove it from, a metal part in, or adjacent to, a machine. The unit has a connected flexible electric cord equipped with a plug-in electric type connector. On the machine are one, or more, panels mounting a plurality of electric outlet sockets, each of which is electrically connected with a source of electric power and with an electric motor for positioning of a tool head element, tool holder element, chuck element, or the like, in the machine tool. The electric motor can be mechanically connected to move these elements with respect to the machine bed, or the bed with respect to the element, set the initial relative positions between elements and bed, or the depth of cut, or sequence of operations, etc. Whatever the function performed by a particular electric circuit connected to a particular outlet socket can be indicated by directions on the panel above that outlet socket.

When the machinist desires to select a particular machine adjustment, he inserts the plug of the portable unit in the indicated outlet socket to complete the control circuit to the motor which operates the part of the machine to be adjusted. The switch part of the unit may have a forward start and stop button, a reverse start and stop button, and a jog button for small increments of tool adjustment to exactly position the tool. During use, the unit may be held in one, or both hands, or it may be held on the machine by a magnetic anchor of the permanent kind, if both hands are busy. When an adjustment is complete, the plug is withdrawn from the socket and applied in the next until the machine set up is complete, after which the unit may be suspended by the magnet in a tool crib. Preferably, the machine is tamper proof without the unit, and the machine adjustments are locked when the unit is stored. In this sense, it acts as a key to lock and unlock a machine adjustment. If, as often happens, it is also desirable to provide such a unit for use in other than set up machine operations, then plugs and sockets can be used which prevent the use of one unit for other than the intended purpose.

Other objects and advantages of this invention will appear from the following detailed description which is in such clear, concise and exact terms as will enable any person skilled in the art to make and use the same when taken with the accompanying drawings, forming a part thereof, and in which.

Figure 1:
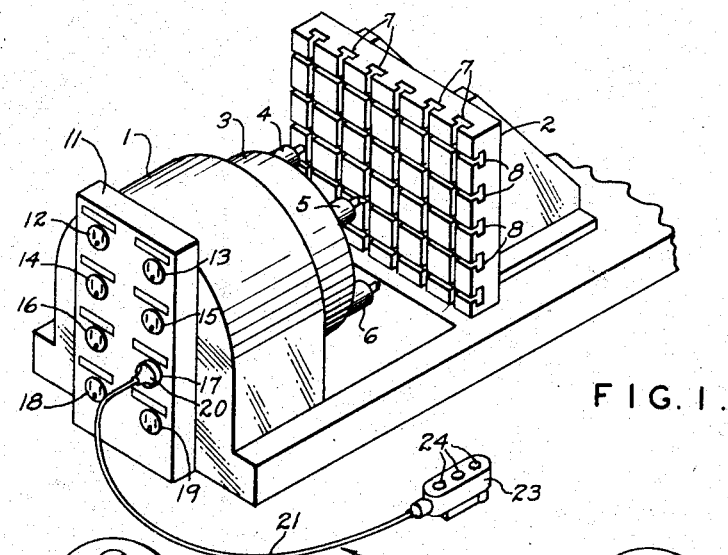
FIG. 1 is a schematic illustration of a portion of a machine tool showing an operative association of the parts to carry out the method and explain the use and application thereof.

Since machine tools take so many different forms, the machine, diagrammatically illustrated in the drawings, is intended as merely representative of one example of how the invention can be practical and how the unit can be combined with a machine tool in accordance with this invention. Thus, by way of example, and with reference to FIG. 1, the machine tool therein shown can be described as a horizontal milling machine with a head stock 1 and a vertical bed 2. On the head stock 1 is a turret-like device 3 mounting a plurality of tool holders, or chucks, 4, 5 and 6. The opposite face of the vertical bed 2 has a plurality of key slots, some of which, indicated collectively as 7, are vertical and other of which are horizontal and indicated collectively as 8.

In the set-up of such a machine, the work is mounted on the vertical face of bed 2 by clamp means secured in the key way slots 7 and 8. The proper tools are mounted in the individual tool holders, or chucks, 4, 5 and 6. The tools can be various shapes of milling cutters necessary to perform the desired cuts on the work piece.

Shown on the back side of the head stock 1 is a panel 11 in which is mounted a plurality of electric outlet sockets 12, 13, 14, 15, 16, 17, 18 and 19. One of those sockets 19 has connected thereto a plug of the electric outlet type 20 which in turn forms part of a unit including an electric cord 21 and a switch box 23 with push buttons 24. Each of the sockets 12 through 19, inclusive, connects with one circuit within the machine, a source of power and a motor for operating a drive moving the bed 2 back and forth, for indexing the turret 3, or for setting the depth of feed for any one of the several tools in the indexed position. These adjustments are provided so that for a machine, such as this kind which performs a sequence of operations, it is possible by plugging the unit into the several sockets selectively to set each tool in the proper position with respect to a work piece at the start of its cutting operation and at the termination of its cutting operation. When once set up, the machine will then form precisely the adjusted cuts according to its program of operation. Thet set-up is accomplished by inserting the plug 20 into a selected socket and then by operating the buttons 24, precisely positioning the tools for the proper sequence of programmed operations for the job. After the set-up is complete, the plug 20 is withdrawn and the unit 25 stored until other set-up operations are required. Once the plug 20 of the unit 25 has been detached and the unit removed, the set-up for the machine cannot be tampered with by a machine operator.

Although only one control panel 11 has been shown, it is possible to duplicate this control panel at different parts of the machine where it is contemplated that duplication would be useful.

As pointed out heretofore, part of a circuit for a particular power operated machine tool element is in the machine and connected with a socket. The other part of any of these circuits connected with the sockets is contained within the portable cord, plug and switch of the unit 25. When plugged into a socket, there is at least one complete control circuit. There may be more than one since it is contemplated that the portable cord 21 and plug 20 may have several individual circuits all separately controlled by a plurality of buttons 24. Consequently, in such a case, plug 20 would have three, or more, prongs which, when plugged into a mating socket wired to more than one circuit, more than one complete control circuit is formed controlled by the plurality of buttons. However, for purposes of illustration, a unit 25 will be described which contains only part of a single circuit and a single button operated switch.

Figure 2:
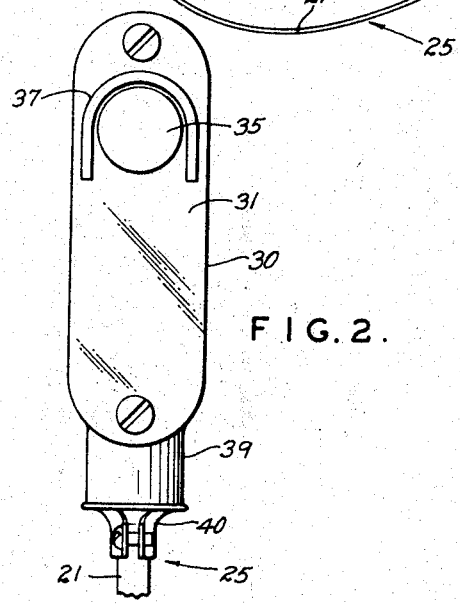
FIG. 2 is a front elevational view of the portable circuit and switch unit such as shown in FIG. 1.
Figure 3:
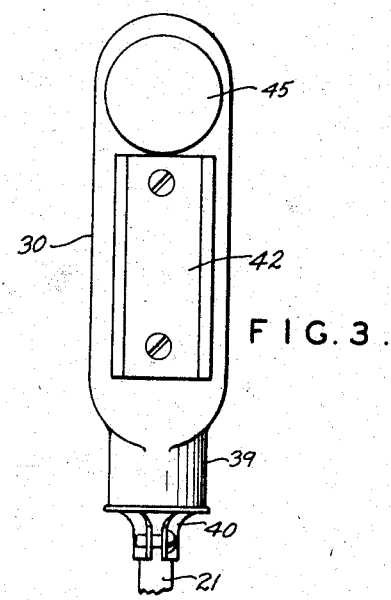
FIG. 3 is a rear elevational view of a portable circuit and switch unit such as shown in FIG. 1.
Figure 4:
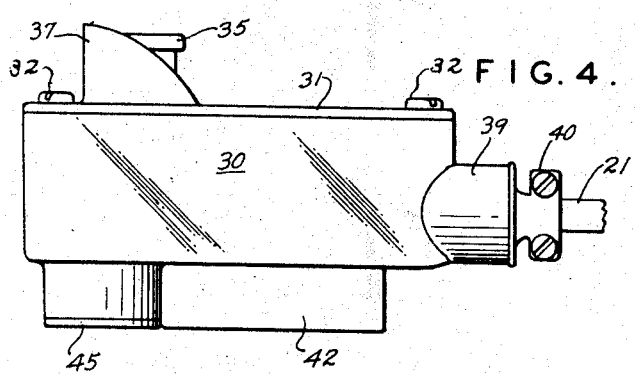
FIG. 4 is a side elevational view of a portable circuit and switch unit such as shown in FIG. 1.

Turning now to FIGS. 2 through 4, the switch box 30 for the unit 25 has a removable cover plate 31 held in place on the switch box 30 by a plurality of screws 32. Cover plate 31 is suitably apertured for projecting switch button 35, and this button is partially shrouded by a button guard 37 formed as part of the cover plate 31. It is intended that the button guard 37 prevent inadvertent operation of the push button 35. Box 30 has a projecting neck 39 carrying a cable clamp, or cord grip, such as shown generally at 40. Portable cord 21 enters the switch box 30 through an insulated bushing within the neck 39 and is therein connected with a suitable switch operated by the button 35.

On the rear face of the switch box 30 is permanent magnet 42 which may be enclosed with a plastic coating. Preferably, the magnet 42 is a permanent type with holding power of approximately eighteen pounds. Adjacent the magnet 42 is a leverage plate, or fulcrum, 45 forming a surface coextensive with and adjacent the exposed surface of the permanent magnet 42.

Switch box 30 is of a size to be conveniently carried in one hand, and the permanent magnet is provided so that the switch box may be conveniently attached in any position on a machine tool while other operations are done by both hands of the machinist, or placed there temporarily when out of use. Of course, it is contemplated that instead of operating the button while holding the switch box 30 in one hand, the machinist might attach the box to the machine by the magnet in a position where it was convenient to operate the button 35. When it is desired to remove the switch box 30, it is gripped by one hand and rocked in a direction around the fulcrum 45, which makes separation easy.

The unit herein described has many uses. If desired, it can be provided with a plug 20 with different kinds of, or arrangements of, prongs for connection with only some kinds of electric outlet. Both the number of prongs and their arrangement is variable as well as the number of electric circuits within the portable cord 21 and the number of switches connected with those circuits and in the switch box 30. Of course, the switch box 30 would usually have at least as many buttons as there were switches and as many switches as individual circuits to be controlled.

Changes in and modifications of the construction described may be made without departing from the spirit of my invention or sacrificing its advantages.

Having thus described the invention, what is claimed and desired to be secured by Letters Patent is:

1. A portable circuit control switch unit for use during set up or adjustment of a machine tool providing for selectively controlling the power supply from a source of electric power to an electric motor means for operation of particular functions of said machine tool, a control panel for said machine tool, electric outlet socket means on said panel and partial electric circuit means for each function of the machine tool connecting said source of electric power, to said outlet socket means and said motor means, said unit comprising:

(a) a flexible electric cord attached at one end to an electric plug type connector and at the other end to a manually operated portable electric switch, said cord being of a length to provide for disposition of said switch in proximity to the operable machine tool, said cord, plug and switch being electrically connected together to form a complementary part of an electric circuit so that when said complementary part is connected with said partial electric circuit means by inserting said plug in an outlet socket means said machine tool has at least one complete switch operated control circuit, (b) a switch box containing said portable electric switch, said switch box having first and second flat surfaces, a portion of said first flat surface being magnetic and a portion being non-magnetic and located juxtaposed the magnetic portion of said surface for forming a fulcrum for prying the magnetic portion loose from adherence to said machine tool, a switch button disposed through said second flat surface and provided upon its depression for energization of the complete control circuit.

2. A portable circuit control switch unit for use during set up or adjustment of a machine tool providing for selectively controlling the power supply from a source of electric power to an electric motor means for operation of particular functions of said machine tool, a control panel for said machine tool, electric outlet socket means on said panel and partial electric circuit means for each function of the machine tool connecting said source of electric power, to said outlet socket means and said motor means, said unit comprising:

(a) a flexible electric cord attached at one end to an electric plug type connector and at the other end to a manually operated portable electric switch, said cord being of a length to provide for disposition of said switch in proximity to the operable machine tool, said cord, plug and switch being electrically connected together to form a complementary part of an electric circuit so that when said complementary part is connected with said partial electric circuit means by inserting said plug in an outlet socket means said machine tool has at least one complete switch operated control circuit, (b) a switch box containing said portable electric switch, said switch box having first and second surfaces, a portion of said first surface being magnetic and a portion being non-magnetic and located juxtaposed the magnetic portion of said surface for forming a fulcrum for prying the magnetic portion loose from adherence to said machine tool, switch means provided with said second surface and upon actuation providing for energization of the complete control circuit.

3. The portable circuit control switch unit of claim 1, and further having a guard integrally projecting from said second flat surface and partially shrouding said switch button for preventing its inadvertent actuation.

4. The portable circuit control switch unit of claim 1, and further having a coating of insulating material covering said magnetic portion of said first flat surface for enhancing its protection.

References Cited

UNITED STATES PATENTS

| 2,792,480 | 5/1957 | Greenman | 200—153 |
| 2,838,963 | 6/1958 | Good et al. | 318—162 X |
| 3,001,119 | 9/1961 | Teddlie | 318—467 |
| 3,198,078 | 8/1965 | Schurger et al. | 318—17 X |

FOREIGN PATENTS

| 495,270 | 8/1950 | Belgium. |

ORIS L. RADER, *Primary Examiner.*

T. LYNCH, *Assistant Examiner.*